US012023916B2

(12) United States Patent
Minamikawa et al.

(10) Patent No.: US 12,023,916 B2
(45) Date of Patent: Jul. 2, 2024

(54) PRINTING APPARATUS WITH CUTTER AND INVERTING MECHANISM

(71) Applicant: BROTHER KOGYO KABUSHIKI KAISHA, Nagoya (JP)

(72) Inventors: Shunsuke Minamikawa, Nagoya (JP); Yusuke Arai, Nagoya (JP); Isao Kobayashi, Nagoya (JP); Koichi Tsugimura, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 52 days.

(21) Appl. No.: 17/930,749

(22) Filed: Sep. 9, 2022

(65) Prior Publication Data

US 2023/0107583 A1 Apr. 6, 2023

(30) Foreign Application Priority Data

Sep. 30, 2021 (JP) ................................ 2021-160227

(51) Int. Cl.

| | |
|---|---|
| ***B41J 11/66*** | (2006.01) |
| ***B41J 3/60*** | (2006.01) |
| ***B41J 11/00*** | (2006.01) |
| ***B41J 13/00*** | (2006.01) |
| *B41J 11/70* | (2006.01) |

(52) U.S. Cl.

CPC ............... *B41J 11/663* (2013.01); *B41J 3/60* (2013.01); *B41J 11/007* (2013.01); *B41J 11/008* (2013.01); *B41J 13/0045* (2013.01); *B41J 11/70* (2013.01)

(58) Field of Classification Search

CPC . B41J 11/663; B41J 3/60; B41J 11/007; B41J 11/008; B41J 13/0045; B41J 11/70

See application file for complete search history.

(56) References Cited

U.S. PATENT DOCUMENTS

| | | | | |
|---|---|---|---|---|
| 2010/0245514 | A1* | 9/2010 | Kaimoto | B41M 5/504 427/256 |
| 2016/0159118 | A1* | 6/2016 | Shishido | B41J 3/60 347/16 |
| 2021/0178785 | A1 | 6/2021 | Miura | |
| 2021/0300092 | A1* | 9/2021 | Yajima | B41J 3/60 |

FOREIGN PATENT DOCUMENTS

| | | | |
|---|---|---|---|
| JP | 2018-186448 | A | 11/2018 |
| JP | 2021-94784 | A | 6/2021 |

* cited by examiner

*Primary Examiner* — Henok D Legesse

(74) *Attorney, Agent, or Firm* — Merchant & Gould P.C.

(57) ABSTRACT

A printing apparatus, having a conveyer, a first conveyer path, a printer, a cutter assembly, and a controller, is provided. The controller controls the printer to print images for at least two pages on a first side of a printing medium; after printing the images on the first side of the printing medium, controls the conveyer to move the printing medium to a second conveyer path being a different path from the first conveyer path through a switchback action and invert the printing medium by conveying in a second conveying direction; after inverting the printing medium, controls the printer to print an image in a predetermined part on a second side opposite to the first side of the printing medium; and after printing the image in the predetermined part on the second side of the printing medium, control the cutter assembly to cut the printing medium.

4 Claims, 10 Drawing Sheets

PRINTING APPARATUS WITH CUTTER AND INVERTING MECHANISM

REFERENCE TO RELATED APPLICATIONS

This application claims priority from Japanese Patent Application No. 2021-160227, filed on Sep. 30, 2021. The entire content of the priority application is incorporated herein by reference.

BACKGROUND ART

A printing apparatus with a cutter assembly capable of cutting a printing medium is known. The printing apparatus may, after printing an image on the printing medium, operate the cutter assembly to cut the printing medium into two pieces to create two printed materials.

DESCRIPTION

With regard to the conventional printing apparatus equipped with the cutter assembly, however, a double-face printing operation to print images on each side of the printing medium may not have been considered.

The present disclosure is advantageous in that a printing apparatus, capable of printing on both sides of a printing medium and cutting the printing medium time-efficiently, is provided.

First Embodiment

<Configuration of Printing Apparatus>

Figure 1:
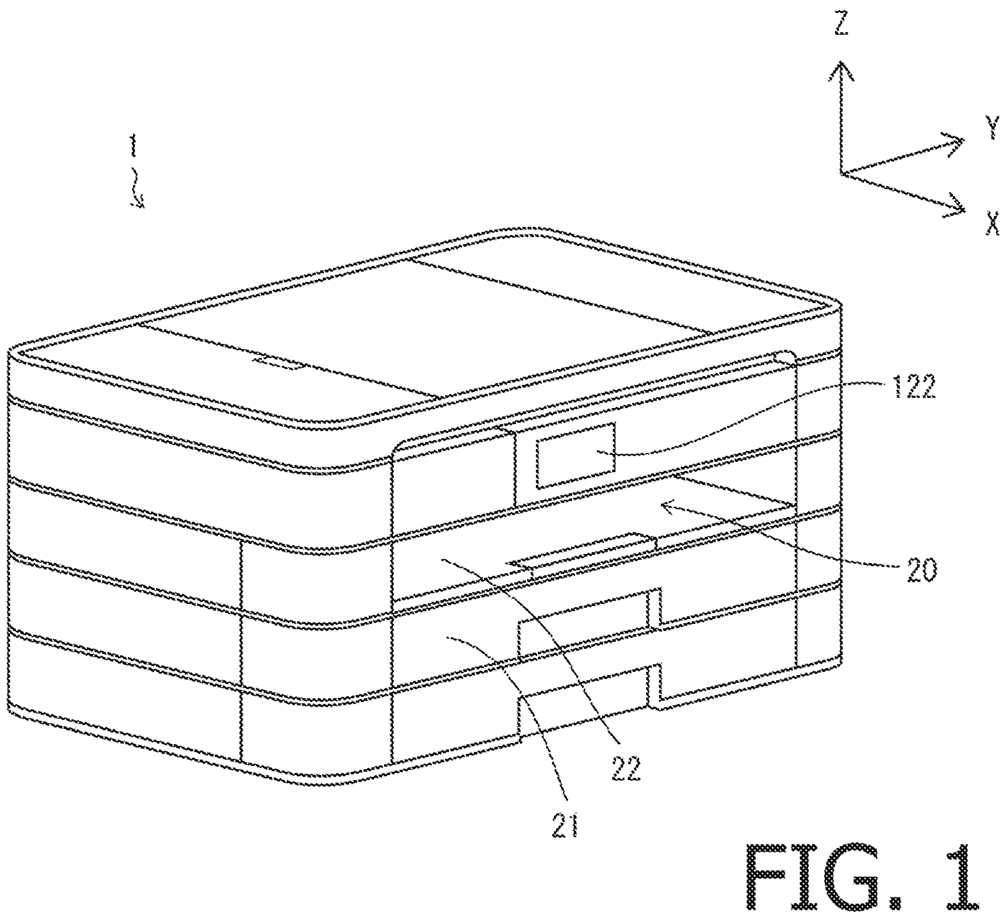
FIG. 1 is a perspective view of a printing apparatus.
Figure 2:
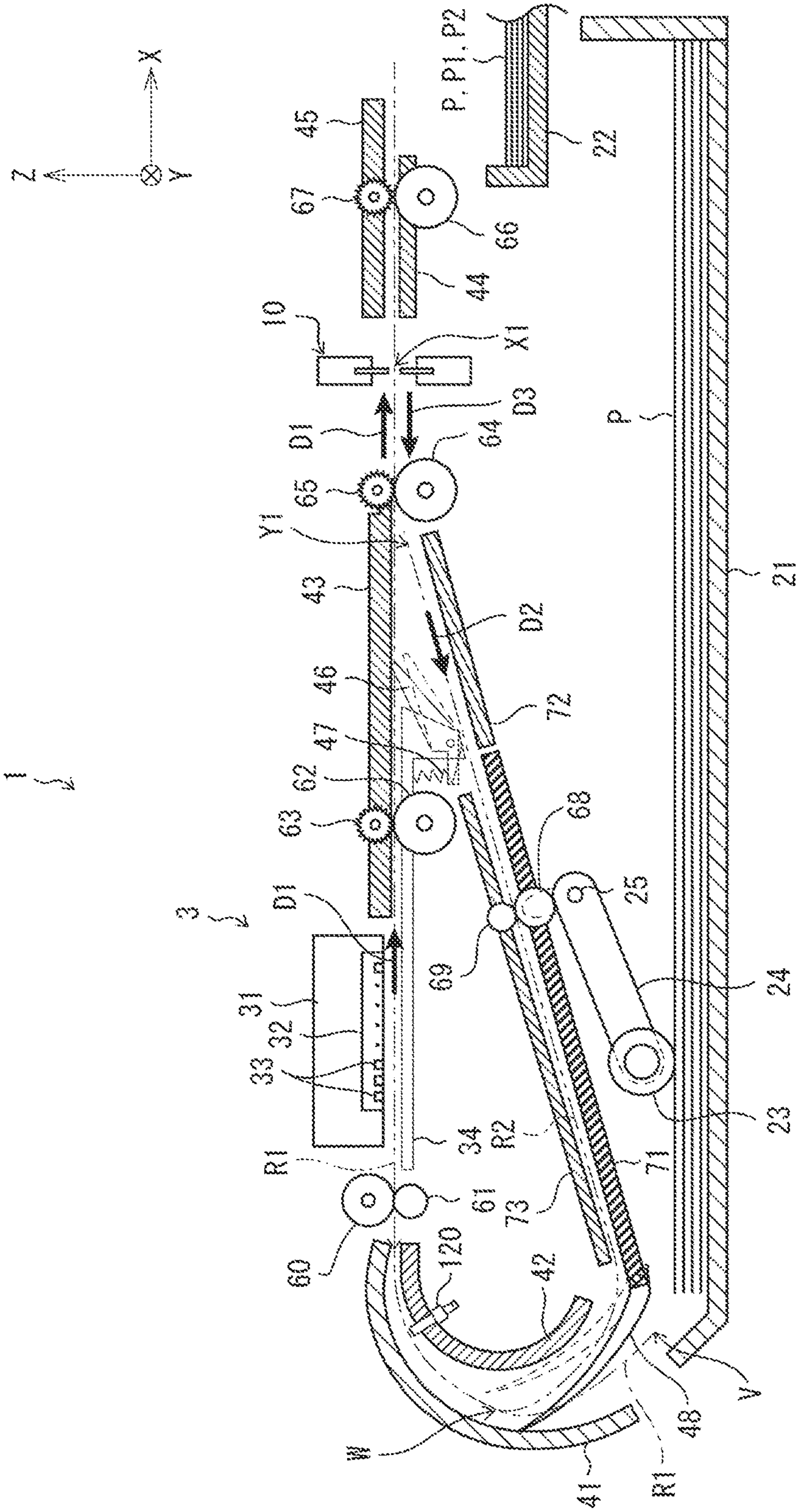
FIG. 2 is a cross-sectional view of the printing apparatus.

FIG. 1 is a perspective view of a printing apparatus 1. FIG. 2 is a cross-sectional view of the printing apparatus 1. The printing apparatus 1 may include a multifunction peripheral machine (MFP) having a plurality of functions including a printing function, a scanning function, a copying function, and a facsimile transmission/receiving function. In the following description, positional relation within the printing apparatus 1 and each part or item included in the printing apparatus 1 will be mentioned on basis of the printing apparatus 1 in an orientation as shown in FIGS. 1 and 2, with reference to X, Y, and Z axes. In particular, a direction from a printer 3 toward a cutter assembly 10 will be called as an X-axis direction, a direction from a feeder tray 21 toward the printer 3 will be called as a Z-axis direction, and a direction intersecting orthogonally with the X-axis direction and the Z-axis direction will be called as a Y-axis direction.

The printing apparatus 1 has an inkjet-styled printing function, by which ink may be discharged at a sheet P based on print data designated by a print job to print an image on the sheet P. The printing apparatus 1 may either be a multicolor printing apparatus or monochrome-alone printing apparatus. The sheet P may not necessarily be limited to paper medium but may include, for example, resin sheets such as an overhead projector (OHP) film.

As shown in FIG. 1, on a front side, i.e., a positive side in the X-axis direction, of the printing apparatus 1, an opening 20 is formed. In the opening 20, the feeder tray 21 and an ejection tray 22 are removably arranged. The feeder tray 21 is a case to store sheets P and is open on a positive side in the Z-axis direction. A size of the sheets P to be stored in the feeder tray 21 may be, for example, A4. As shown in FIG. 2, on a positive side of the feeder tray 21 in the X-axis direction, the ejection tray 22 is located. The ejection tray 22 may be a tray, in which the sheets P including a first sheet P1 and a second sheet P2 ejected by a conveyer roller 66 may rest. The ejection tray 22 is open on the positive side in the Z-axis direction.

As shown in FIG. 1, on the front side of the printing apparatus 1, a setting device 122 including a display screen is arranged. The setting device 122 may include, for example, a touch panel, through which settings concerning printing actions may be input with a user's touching operations. The setting device 122 may accept settings, which include information concerning the size of the sheets P and information indicating whether a cutting action will be conducted. The settings input through the setting device 122 may be output to a controller 100 (see FIG. 3).

As shown in FIG. 2, the printing apparatus 1 has a feeder roller 23, the printer 3, a first conveyer path R1, conveyer rollers 60, 62, 64, 66, 68, a first flap 46, a second flap 48, a second conveyer path R2, and a cutter assembly 10. The conveyer rollers 60, 62, 64, 66, 68 may convey the sheets P. A number of rollers in the first conveyer path R1 and the second conveyer path R2 may not necessarily be limited but may be modified optionally. For example, the conveyer roller 66 may be omitted.

The feeder roller 23 may feed the sheets P stored in the feeder tray 21 to a conveyance-start position V in the first conveyer path R1. The feeder roller 23 is rotatably supported at a tip end of a feeder arm 24. The feeder arm 24 is pivotably supported by a shaft 25, which is supported by a frame of the printing apparatus 1. The feeder roller 23 may be driven by a feeder motor 107 (see FIG. 3) to rotate normally. By the normal rotation of the feeder roller 23, the sheets P stored in the feeder tray 21 may be fed to the conveyance-start position V in the first conveyer path R1 one by one.

The first conveyer path R1 is a path to convey the sheets P in a first conveying direction D1. In particular, the first conveyer path R1 extends toward the positive side in the Z-axis direction from an end of the feeder tray 21 on a negative side in the X-axis direction and curves at a part delimited by the guide members 41, 42. The first conveyer path R1 extends linearly at a part delimited by guide members 43, 44, 45 in a range from a position of the printer 3 to the ejection tray 22.

The first conveying direction D1 is a direction, in which, when the printer 3 prints an image on the sheet P, the sheet P moves through a cutting position X1. In other words, the first conveying direction D1 a direction from the printer 3 toward the cutting position X1. A second conveying direction D2 is a direction from the cutter assembly 10 toward the second conveyer path R2. A third conveying direction D3 is a direction opposite to the first conveying direction D1.

At a position upstream from the printer 3 in the first conveying direction D1 along the first conveyer path R1, the conveyer roller 60 is arranged. At a position to face the conveyer roller 60, a pinch roller 61 is arranged. The conveyer roller 60 may be driven by a conveyer motor 108 (see FIG. 3) to rotate. The pinch roller 61 may rotate along with the rotation of the conveyer roller 60. By the conveyer roller 60 and the pinch roller 61 rotating normally, the sheet P pinched between the conveyer roller 60 and the pinch roller 61 may be conveyed to the printer 3 and farther.

The printer 3 is arranged between the conveyer roller 60 and the conveyer roller 62 along the first conveyer path R1 and may print an image on the sheet P. The printer 3 includes a carriage 31, a recording head 32, a plurality of nozzles 33, and a platen 34. The recording head 32 is mounted on the carriage 31. On a lower surface of the recording head 32, which is on a negative side in the Z-axis direction, the plurality of nozzles 33 are arranged. The recording head 32 may discharge ink droplets through the nozzles 33.

The platen 34 is a substantially rectangular plate, on which the sheet P may be placed. The platen 34 may support the sheet P thereon. While the sheet P is supported by the platen 34, the carriage 31 may move, and the nozzles 33 may discharge the ink droplets at the sheet P selectively. Thereby, an image may be printed on the sheet P. A driving force from a carriage motor 109 (see FIG. 3) may be transmitted to the carriage 31, and the carriage 31 may move to reciprocate in a direction intersecting orthogonally with the first conveying direction D1, i.e., a widthwise direction of the sheet P.

The controller 100 may control conveyance of the sheet P to pause and operate the carriage 31 to move in the widthwise direction of the sheet P and the recording head 32 to discharge the ink droplets from the nozzles 33. The controller 100 may conduct a printing process, in which the controller 100 operates the carriage 31 and the recording head 32 to print one of lines composing an image on the sheet P, and a linefeed process, in which the controller 100 operates the conveyer rollers 60, 62 to convey the sheet P by a predetermined linefeed amount, alternately and repeatedly to ultimately print the image on the sheet P.

At a position downstream from the printer 3 in the first conveying direction D1 along the first conveyer path R1, the conveyer roller 62 is arranged. At a position to face the conveyer roller 62, a spur roller 63 is arranged. The conveyer roller 62 may be driven by the conveyer motor 108 to rotate. The spur roller 63 may rotate along with the rotation of the conveyer roller 62. By the conveyer roller 62 and the spur roller 63 rotating normally, the sheet P pinched between the conveyer roller 62 and the spur roller 63 may be conveyed downstream in the first conveying direction D1.

At a position downstream from the conveyer roller 62 in the first conveying direction D1 along the first conveyer path R1, the conveyer roller 64 is arranged. At a position to face the conveyer roller 64, a spur roller 65 is arranged. The conveyer roller 64 may be driven by the conveyer motor 108 to rotate. The spur roller 65 may rotate along with the rotation of the conveyer roller 64. The conveyer roller 64 and the spur roller 65 may rotate either normally or reversely.

By the conveyer roller 64 and the spur roller 65 rotating normally, the sheet P pinched between the conveyer roller 64 and the spur roller 65 may be conveyed toward the cutter assembly 10. On the other hand, by the conveyer roller 64 and the spur roller 65 rotating reversely, the sheet P may be conveyed to the second conveyer path R2 along a lower surface of a first flap 46 on the negative side in the Z-axis direction.

The first flap 46 is arranged at a position between the conveyer roller 62 and the conveyer roller 64 in the first conveyer path R1. The first flap 46 is located in proximity to a branch position Y1, which is below the guide member 43. The first flap 46 is supported by the platen 34 and is pivotable between a first posture and a second posture.

When the first flap 46 is in the first posture, as drawn in solid lines in FIG. 2, the first flap 46 contacts the guide member 43 and closes the first conveyer path R1. On the other hand, when the first flap 46 is in the second posture, as drawn in broken lines in FIG. 2, the first flap 46 is located to be lower than the first flap 46 in the first posture and is separated from the guide member 43, reserving a gap to allow the sheet P to be conveyed in the first conveying direction D1 between the first flap 46 and the guide member 43.

The first flap 46 is urged toward the positive side in the Z-axis direction by a coil spring 47. The coil spring 47 is connected to the first flap 46 at one end and to the platen 34 at the other end. The first flap 46 being urged by the coil spring 47 tends to stay in the first posture, in which a frontward end of the first flap 46 contacts the guide member 43.

The cutter assembly 10 is located between the conveyer roller 64 and the conveyer roller 66 in the first conveyer path R1. The cutter assembly 10 may be a known cutter assembly having a pair of upper and lower blades, between which the sheet P may be cut, and a cutter carriage. In particular, the cutter assembly 10 may cut the sheet P at a predetermined position in the widthwise direction of the sheet P by moving the cutter carriage in the widthwise direction. Optionally, the cutter assembly 10 may solely have one of the upper and lower blades. Further optionally, the cutter assembly 10 may be located between the guide members 41, 42 and the conveyer roller 60 in the first conveyer path R1.

At a position downstream from the cutter assembly 10 in the first conveying direction D1 along the first conveyer path R1, the conveyer roller 66 is arranged. At a position to face the conveyer roller 66, a spur roller 67 is arranged. The conveyer roller 66 may be driven by the conveyer motor 108 to rotate. The spur roller 67 may rotate along with the rotation of the conveyer roller 66. By the conveyer roller 66 and the spur roller 67 rotating normally, the first sheet P and the second sheet P may be conveyed downstream by the conveyer roller 66 in the first conveying direction D1.

At a merge position W between the first conveyer path R1 and the second conveyer path R2, a second flap 48 is pivotably attached to a guide member 71. In particular, the second flap 48 is pivotable between a first posture, as drawn in solid lines in FIG. 2, and a second posture, as drawn in broken lines in FIG. 2. When the second flap 48 is in the first posture, the second flap 48 and the guide member 42 form a part of the second conveyer path R2. On the other hand, when the second flap 48 is in the second posture, the second flap 48 and the guide member 41 form a part of the first conveyer path R1.

At a position upstream from the conveyer roller 60 in the first conveying direction D1 along the first conveyer path R1, a registration sensor 120 is arranged. The registration sensor 120 may detect a front end and a rear end of the sheet P moving through a contact position, at which the sheet P contacts the conveyer roller 60. The registration sensor 120 may include, for example, a sensor having an actuator that may be moved to swing by the sheet P contacting the actuator, and, for another example, an optical sensor.

The registration sensor 120 may output ON signals while the sheet P is moving through the contact position and OFF signals while the sheet P is absent at the contact position. In other words, the registration sensor 120 outputs the ON signals between a time point, at which the front end of the sheet P reaches the position of the registration sensor 120, and a time point, at which the rear end of the sheet P passes through the position of the registration sensor 120, or otherwise outputs the OFF signals. The signals from the registration sensor 120 may be output to the controller 100.

To the conveyer roller 60, a rotary encoder 121 (see FIG. 3) that may detect rotation of the conveyer roller 60 is attached. The rotary encoder 121 may output pulse signals to the controller 100 according to the rotation of the conveyer roller 60. The rotary encoder 121 includes an encoder disk and an optical sensor. The encoder disk may rotate along with the rotation of the conveyer roller 60. The optical sensor may read the rotating encoder disk, generate pulse signals, and output the generated pulse signals to the controller 100.

The second conveyer path R2 is a path, in which the sheet P may be conveyed in the second conveying direction D2, and is different from the first conveyer path R1. The second conveyer path R2 is a path delimited at least by guide members 71, 72, 73, the conveyer roller 68, and a pinch roller 69.

The second conveyer path R2 branches from the first conveyer path R1 at a branch position Y1, which is at an upstream position from the conveyer roller 64 in the first conveying direction D1, and merges with the first conveyer path R1 at the merge position W, which is at a position upstream from the printer 3 in the first conveying direction D1 along the first conveyer path R1. In this arrangement, the printing apparatus 1 may print images on both side of the sheet P in a double-face printing process, which will be described further below. Optionally, the branch position Y1 may be located between the guide members 41, 42 and the conveyer roller 60 in the first conveyer path R1.

<Electrical Configuration of Printing Apparatus>

Figure 3:
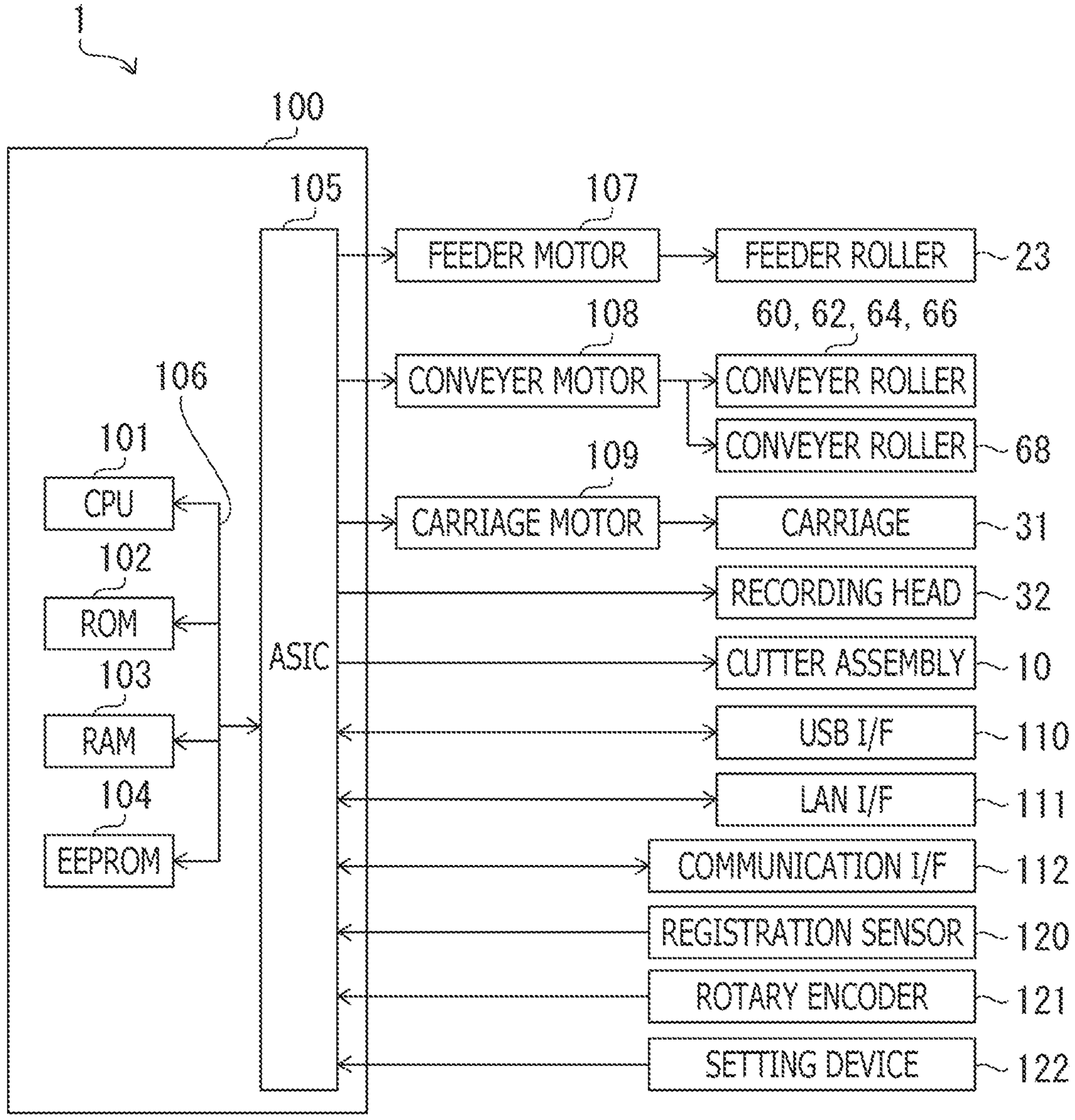
FIG. 3 is a block diagram to illustrate an electrical configuration of the printing apparatus.

FIG. 3 is a block diagram to illustrate an electrical configuration of the printing apparatus 1. As shown in FIG. 3, the printing apparatus 1 includes the feeder motor 107, the conveyer motor 108, the carriage motor 109, the controller 100, a universal serial bus (USB) interface 110, a local area network (LAN) interface 111, a communication interface 112, the registration sensor 120, the rotary encoder 121, and the setting device 122.

The controller 100 includes a central processing unit (CPU) 101, a read only memory (ROM) 102, a random access memory (RAM) 103, an EEPROM, and an ASIC 105, which are mutually connected through an internal bus 106. EEPROM is a registered trademark of Renesas Electronics Corp. The ROM 102 may store programs to conduct actions and processes in the printing apparatus 1.

The RAM 103 may serve as a storage area to temporarily store various types of data to be used when the CPU 101 executes the programs and a work area for various types of data and programs. The EEPROM 104 stores setting information to be maintained while the power to the printing apparatus 1 is on and off. The controller 100 may control actions of the devices in the printing apparatus 1, including the feeder motor 107, the conveyer motor 108, the carriage motor 109, the recording head 32, and the cutter assembly 10, based on the controlling program read from the ROM 102.

The ASIC 105 is connected with the feeder motor 107, the conveyer motor 108, the carriage motor 109, the recording head 32, the cutter assembly 10, the USB interface 110, the LAN interface 111, the communication interface 112, the registration sensor 120, the rotary encoder 121, and the setting device 122.

The ASIC 105 may supply driving current to the feeder motor 107, the conveyer motor 108, the carriage motor 109. The controller 100 may control rotation of the feeder motor 107, the conveyer motor 108, and the carriage motor 109 under, for example, pulse-width modulation control (PWM). The controller 100 may apply driving voltage to vibrating elements in the recording head 32 to cause the ink droplets to be discharged through the nozzles 33. The controller 100 may detect conditions of the printing apparatus 1 based on the signals output from the registration sensor 120 and the rotary encoder 121.

In particular, the controller 100 may detect the sheet P passing through the contact position, at which the sheet P contacts the conveyer roller 60, based on the signals from the registration sensor 120. The controller 100 may detect a rotated amount of the conveyer roller 60 based on the pulse signals output from the rotary encoder 121. Moreover, after the registration sensor 120 outputs the ON signals, the controller 100 may estimate an amount of conveyance of the sheet P in the first conveyer path R1 based on the pulse signals output from the rotary encoder 121.

To the USB interface 110, a USB-connectable device such as a USB memory or a USB cable may be connected. To the LAN interface 111, a personal computer (PC) may be connected through a LAN cable. The controller 100 may receive a print job through the USB interface 110 or the LAN interface 111 and control the devices in the printing apparatus 1 to print an image on the sheet P based on print data designated by the print job.

<Cut-Print Process by Controller>

Figure 4:
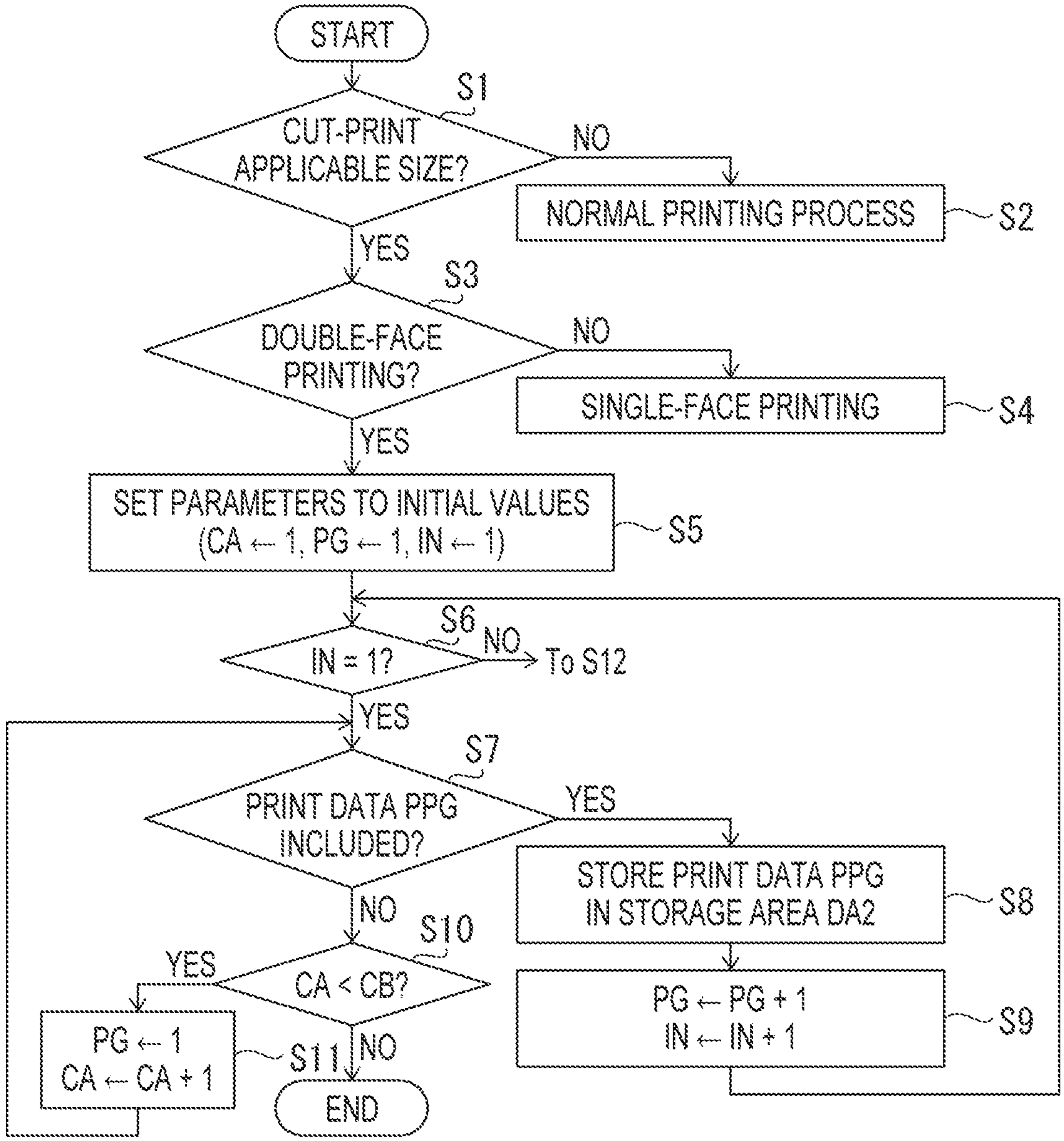
FIG. 4 is a flowchart to illustrate a part of a process to store print data in a storage device in the printing apparatus.
Figure 5:
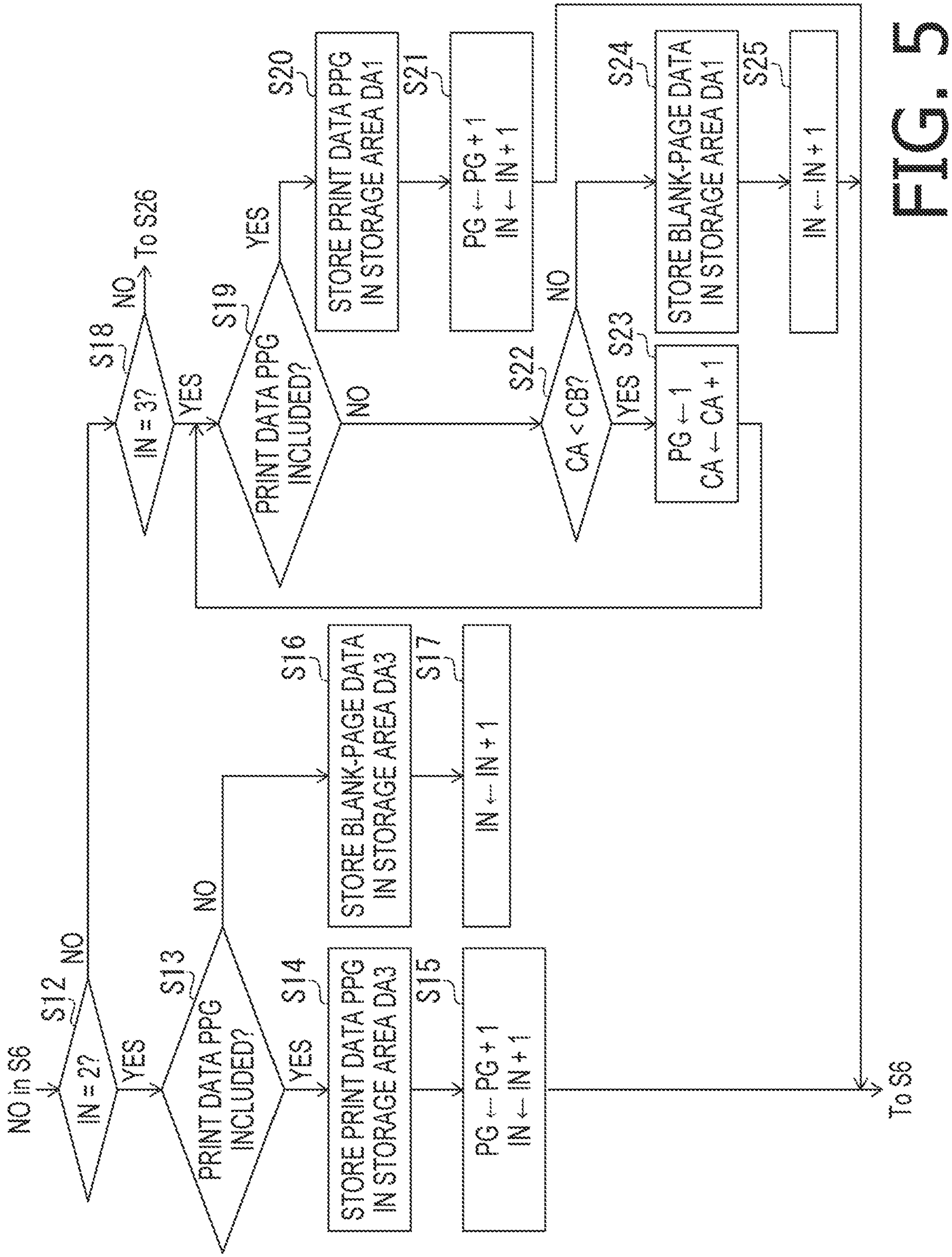
FIG. 5 is a flowchart to illustrate another part of the process to store print data in the storage device in the printing apparatus.
Figure 6:
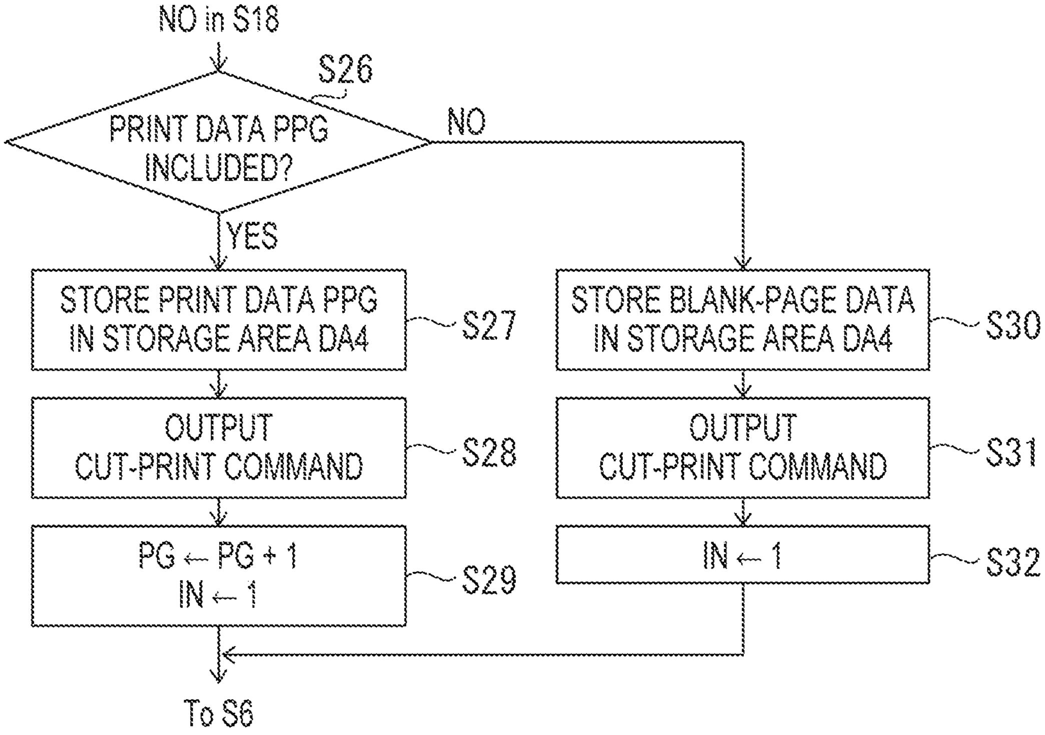
FIG. 6 is a flowchart to illustrate another part of the process to store print data in the storage device in the printing apparatus.
Figure 7:
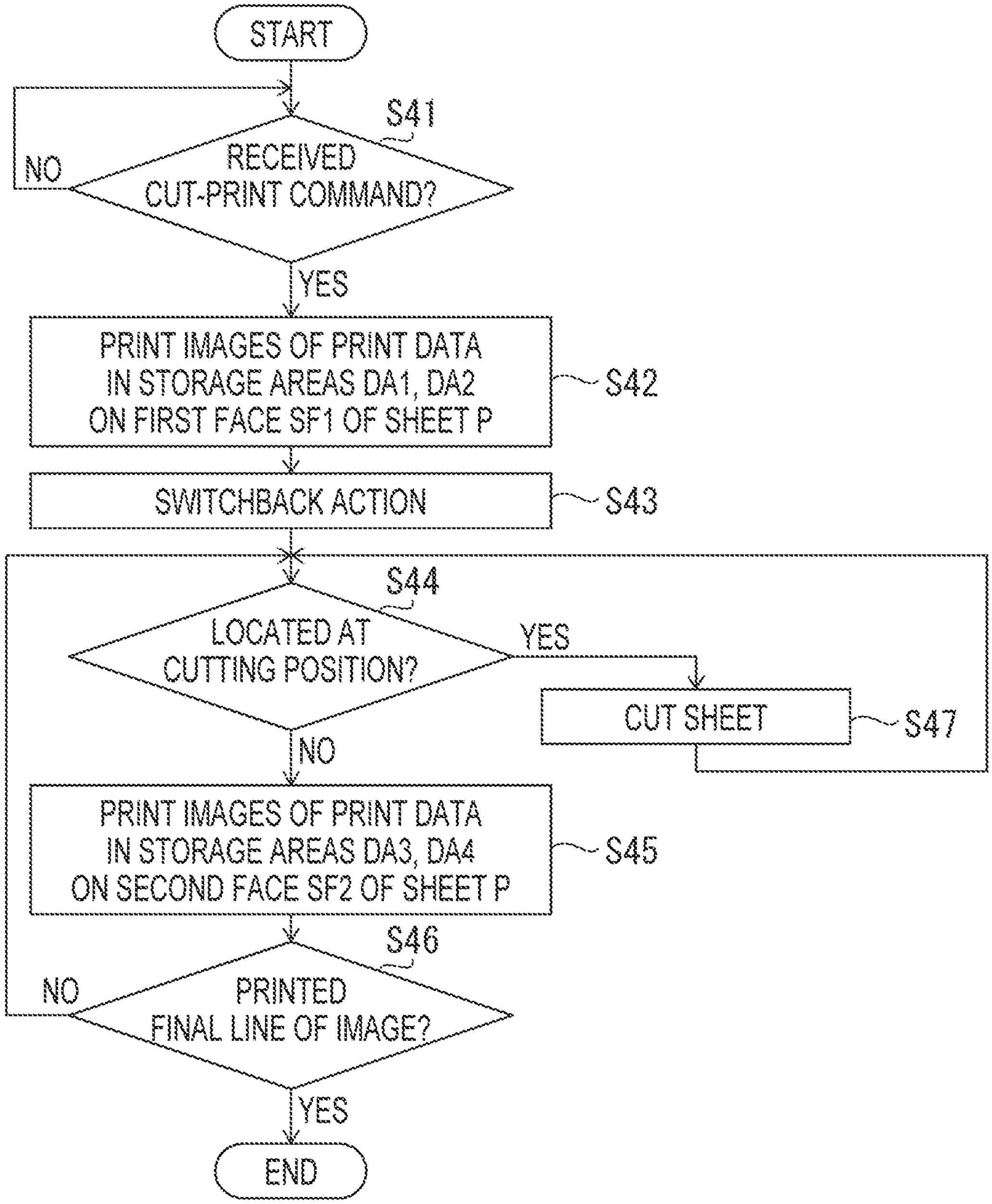
FIG. 7 is a flowchart to illustrate a cut-print process to be conducted in the printing apparatus.
Figure 8:
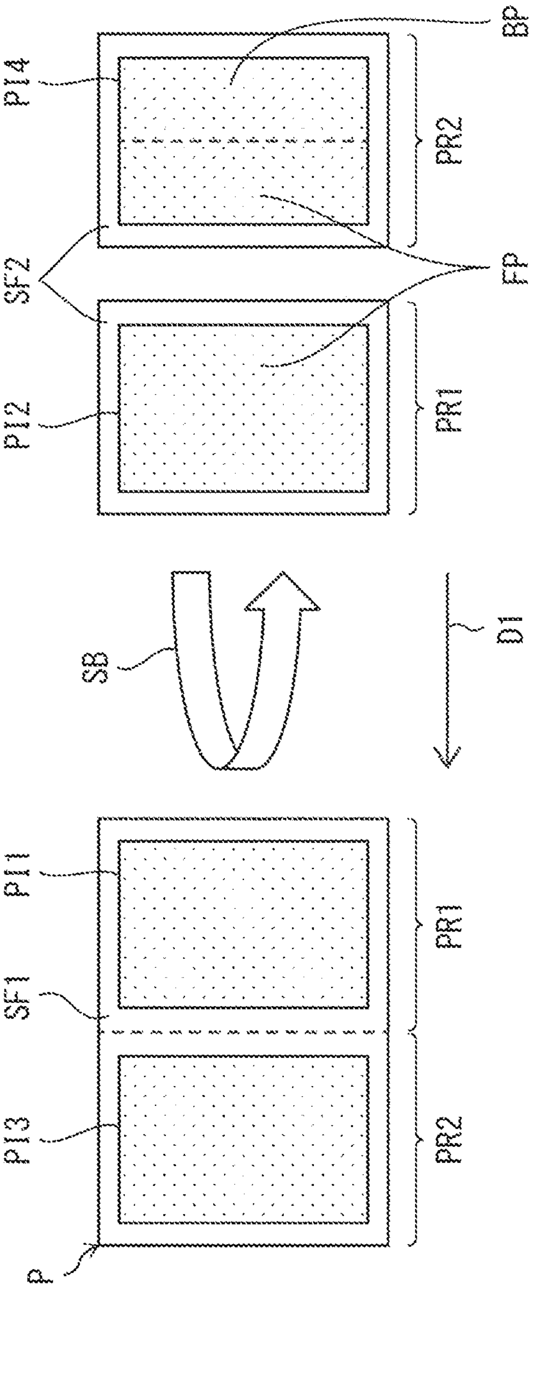
FIG. 8 illustrates how images and pages are allocated in a sheet for the print-cut process in the printing apparatus.

FIG. 4 is a flowchart to illustrate a part of a print data storing process conducted by the controller 100. FIG. 5 is a flowchart to illustrate another part of the print data storing process continued from the flowchart in FIG. 4. FIG. 6 is a flowchart to illustrate another part of the print data storing process continued from the flowchart in FIG. 5. FIG. 7 is a flowchart to illustrate a cut-print process conducted by the controller 100. FIG. 8 illustrates how images and pages are allocated in a sheet P for the print-cut process to be conducted by the controller 100. The processes illustrated in FIGS. 4-8 compose a sort-print process, through which multiple printed copies of collated images, are created.

As shown in FIG. 4, the controller 100 determines whether a size of the sheets P designated by the received print job is a size, to which the cut-print process is applicable (S1). If the controller 100 determines that the size of the sheet P designated by the received print job is a size, to which the cut-printing process is inapplicable (S1: NO), the controller 100 conducts a normal printing process, in which the sheet P remains uncut (S2).

If the controller determines that the size of the sheet P designated by the received print job is a size, to which the cut-printing process is applicable (S1: YES), the controller 100 determines based on the received print job whether a double-face printing is to be conducted (S3). If the controller 100 determines that a double-face printing is not to be conducted (S3: NO), the controller 100 conducts a single-face printing process (S4).

If the controller 100 determines that a double-face printing is to be conducted (S3: YES), the controller sets parameter values to initial values (S5). In particular, the controller 100 sets each of parameters CA, PG, and IN to 1. CA is a parameter indicating a current copy number, PG is a parameter indicating a current page number, and IN is a parameter to be used in the process. The controller 100 sets each of the CA, PG, and IN to 1, and thereafter, determines whether IN is 1 (IN=1) (S6).

If the controller 100 determines that IN is 1 (S6: YES), the controller 100 determines whether the received print job includes print data PPG, which is print data for the PG-th page (S7). If the controller 100 determines that the received print job contains print data PPG (S7: YES), the controller stores the print data PPG in a storage area DA2 in the RAM 103 (S8).

The storage area DA2 is an area to store print data for a first image PI1. As shown in FIG. 8, the first image PI1 is an image to be printed in a range included in a first part PR1, which is a part of the sheet P, on a first face SF1 being one of the two faces of the sheet P. The first image PI1 is an image to appear on a first page, which is a page arranged firstly in the copy, within the images to be printed on the pages in the sheet P. The controller 100 stores the print data PPG in the storage area DA2 (S8) and increments PG and IN by 1 (S9). The controller 100 returns to S6.

If the controller 100 determines that the received print job does not contain print data PPG (S7: NO), the controller 100 determines based on the print job whether CB is greater than CA (S10). CB represents a total number of copies to be created indicated in the received print job.

If the controller 100 determines that CB is equal to or smaller than CA (S10: NO), the controller ends the print data storing process. If the controller 100 determines that CB is greater than CA (S10: YES), the controller 100 sets PG to 1 and increments CA by 1 (S11). The controller 100 returns to S7.

If the controller 100 determines that IN is not 1 (S6: NO), the controller 100 determines whether IN is 2 (S12), as shown in FIG. 5. If the controller 100 determines that IN is 2 (S12: YES), the controller 100 determines whether the received print job includes the print data PPG for the PG-th page (S13). If the controller 100 determines that the received print job contains the print data PPG for the PG-th page (S13: YES), the controller 100 stores the print data PPG in a storage area DA3 in the RAM 103 (S14).

The storage area DA3 is an area to store either print data for a second image PI2 or blank-page data. As shown in FIG. 8, the second image PI2 is an image to be printed in a range included in the first part PR1, on a second face SF2 being the other of the two faces of the sheet P opposite to the first face SF1. The second image PI2 is an image to appear on a second page, which is a page arranged to be later than the page containing the first image PI1 in the copy, within the images to be printed on the pages in the sheet P. The controller 100 stores the print data PPG in the storage area DA3 (S14) and thereafter increments PG and IN by 1 (S15). The controller 100 returns to S6.

If the controller 100 determines that the received print job does not contain the print data PPG for the PG-th page (S13: NO), the controller 100 stores blank-page data in the storage area DA3 (S16) and increments IN by 1 (S17). The controller returns to S6.

If the controller 100 determines that IN is not 2 (S12: NO), the controller 100 determines whether IN is 3 (S18). If the controller 100 determines that IN is 3 (S18: YES), the controller 100 determines whether the received print job includes the print data PPG for the PG-th page (S19). If the controller 100 determines that the received print job contains the print data PPG for the PG-th page (S19: YES), the controller 100 stores the print data PPG in a storage area DA1 in the RAM 103 (S20).

The storage area DA1 is an area to store either print data for a third image PI3 or blank-page data. As shown in FIG. 8, the third image PI3 is an image to be printed in a range included in a second part PR2, on the first face SF1 of the sheet P. The third image PI3 is an image to appear on a third page, which is a page arranged to be later than the page containing the second image PI2 in the copy, within the images to be printed on the pages in the sheet P. The controller 100 stores the print data PPG in the storage area DA1 (S20) and thereafter increments PG and IN by 1 (S21). The controller 100 returns to S6.

If the controller 100 determines that the received print job does not contain the print data PPG for the PG-th page (S19: NO), the controller 100 determines based on the print job whether CB is greater than CA (S22). If the controller 100 determines that CB is equal to or smaller than CA (S22: NO), the controller 100 stores blank-page data in the storage area DA1 (S24) and increments IN by 1 (S25). The controller returns to S6.

If the controller 100 determines that CB is greater than CA (S22: YES), the controller 100 sets PG to 1 and increments CA by 1 (S23). The controller 100 returns to S19. If the controller 100 determines that IN is not 3 (S18: NO), the controller 100 determines whether the received print job includes the print data PPG for the PG-th page (S26), as shown in FIG. 6. If the controller 100 determines that the received print job contains the print data PPG for the PG-th page (S26: YES), the controller 100 stores the print data PPG in a storage area DA4 in the RAM 103 (S27).

The storage area DA4 is an area to store either print data for a fourth image PI4 or blank-page data. As shown in FIG. 8, the fourth image PI4 is an image to be printed in a range included in the second part PR2, on the second face SF2 of the sheet P. The fourth image PI4 is an image to appear on a fourth page, which is a page arranged to be later than the page containing the third image PI3 in the copy, within the images to be printed on the pages in the sheet P. Each of the first through fourth images PI1-PI4 is an image composed of a piece of print data for one of the pages contained the print job.

The controller 100 stores the print data PPG in the storage area DA4 (S27) and outputs a cut-print command (S28), and thereafter, increments PG by 1 and sets IN to 1 (S29). The controller 100 returns to S6.

If the controller 100 determines that the received print job does not contain the print data PPG for the PG-th page (S26: NO), the controller 100 stores blank-page data in the storage area DA4 (S30) and outputs a cut-print command (S31), and thereafter, sets IN to 1 (S32). The controller 100 returns to S6.

Next, with reference to FIG. 7, the cut-print process to be conducted by the controller 100 will be described. As shown in FIG. 7, the controller 100 determines whether the cut-print command output in S28 or S31 is received (S41). If the controller 100 determines that no cut-print command is received (S41: NO), the controller 100 waits for the cut-print command to be received.

If the controller 100 determines that the cut-print command output in S28 or S31 is received (S41: YES), the controller 100 operates the printer 3 to print the third image PI3 composed of the print data stored in the storage area DA1 in the range included in the second part PR2 on the first face SF1 of the sheet P (S42). Moreover, the controller 100 operates the printer 3 to print the first image PI1 composed of the print data stored in the storage area DA2 in the range included in the first part PR1 on the first face SF1 of the sheet P (S42). If the storage area DA1 stores blank-sheet data, the controller 100 does not operate the printer 3 to print an image in the range included in the second part PR2 on the first face SF1 of the sheet P. The process to print the images on the first face SF1 of the sheet P in S42 may be herein called as a first image printing process.

Thus, in S42, the controller 100 operates the printer 3 to print the images for two pages, which may include a blank page, on the first face SF1 of the sheet P. Optionally, in S42, the controller 100 may operate the printer 3 to print images for three or more pages on the first face SF1 of the sheet P. In other words, the controller 100 may operate the printer 3 to print images for at least two pages on the first face SF1 of the sheet P.

Following S42, the controller 100 operates the conveyer rollers 60, 62, 64, 66, 68 to conduct a switchback action SB (see FIG. 8) to move the sheet P from the first conveyer path R1 to the second conveyer path R2 and convey the sheet P in the second conveying direction D2 (S43). Through the switchback action SB in S43, the sheet P is inverted.

As shown in FIG. 8, prior to the switchback action SB in S43, the first part PR1 of the sheet P is located upstream in the first conveying direction D1, and the second part PR2 is located downstream in the first conveying direction D1. After the switchback action SB in S43, the first part PR1 of the sheet P is located downstream in the first conveying direction D1, and the second part PR2 is located upstream in the first conveying direction D1.

Following S43, the controller 100 determines whether a border between the first part PR1 and the second part PR2 in the sheet P is located at the cutting position X1 (S44). If the controller 100 determines that the border between the first part PR1 and the second part PR2 in the sheet P is not located at the cutting position X1 (S44: NO), the controller 100 operates the printer 3 to print the second image PI2 composed of the print data stored in the storage area DA3 in the range included in the first part PR1 on the second face SF2 of the sheet P (S45).

Moreover, in S45, the controller 100 operates the printer 3 to print the fourth image PI4 composed of the print data stored in the storage area DA4 in the range included in the second part PR2 on the second face SF2 of the sheet P (S45). In particular, in S45, the controller 100 conducts the printing process for the second image PI2 and the fourth image PI4 while operating the conveyer rollers 60, 62, 64, 66 to convey the sheet P each time one of the lines composing the second image PI2 and the fourth image PI4 is printed.

Meanwhile, if the storage area DA3 contains the blank-sheet data, the controller 100 does not operate the printer 3 to print an image in the range included in the first part PR1 on the second face SF2 of the sheet P. If the storage area DA4 contains the blank-sheet data, the controller 100 does not operate the printer 3 to print an image in the range included in the second part PR2 on the second face SF2 of the sheet P.

Thus, in S45, the controller 100 may operate the printer 3 to print the images on the sheet P until the sheet P is cut by the cutter assembly 10. In this regard, printing of the images in S45 conducted before the sheet P is cut may herein be called as a second image printing process. In the second image printing process, the controller 100 operates the printer 3 to print the image in a predetermined part on the second face SF2 of the sheet P. In particular, in S45 before the sheet P is cut, the controller 100 may operate the printer 3 to print the images in the predetermined part being a frontward part FP on the second face SF2 of the sheet P (see FIG. 8).

The frontward part FP consists of the range included in the first part PR1 and a part of the range included in the second part PR2 on the second face SF2 of the sheet P. In other words, the frontward part FP consists of the range, in which the second image PI2 is printed, and a part of the range, in which the fourth image PI4 is printed, on the second face SF2 of the sheet P.

Meanwhile, optionally, the cutter assembly 10 may be located between the guide members 41, 42 and the conveyer roller 60. In this arrangement, the frontward part FP may consist of a part of the range included in the first part PR1 on the second face SF2 of the sheet P, i.e., a part of the range, in which the second image PI2 is to be printed on the second face SF2 of the sheet P.

Following S45, the controller 100 determines whether a final line of image among the lines of images composing the second image PI2 and the fourth image PI4 is printed completely (S46). If the controller 100 determines that the final line of image among the lines of images composing the second image PI2 and the fourth image PI4 is printed completely (S46: YES), the controller 100 ends the cut-print process.

After the cut-print process, the controller 100 operates the conveyer rollers 60, 62, 64, 66 to convey the first sheet P1 and the second sheet P2, which were created in S47 described below, to eject at the ejection tray 22. If the controller 100 determines that the final line of image among the lines of images composing the second image PI2 and the fourth image PI4 is not printed completely (S46: NO), the controller 100 returns to S44.

In S44, if the controller 100 determines that the border between the first part PR1 and the second part PR2 in the sheet P is located at the cutting position X1 (S44: YES), the controller 100 operates the cutter assembly 10 to cut the sheet P to divide into the first part PR1 and the second part PR2, which are located frontward and rearward, respectively, in the first conveying direction D1 in the first conveyer path R1 (S47). The controller 100 thus conducts S47 after the second image printing process in S45. The first sheet P1 equates to the first part PR1 of the sheet P, and the second sheet P2 equates to the second part PR2 of the sheet P. Thus, in S47, the sheet P is cut into a plurality of pieces.

According to this flow, in S42, the images are printed on the first face SF1 of the sheet P, and thereafter, in S43, the sheet P is inverted through the switchback action. Therefore, the double-face printing may be conducted with the sheet P through the single switchback action. In other words, a number of switchback actions may be reduced. Therefore, double-face printing and cutting the sheet P may be conducted in a shorter time.

After S47, the controller 100 returns to S44, in which the controller 100 determines whether the sheet P is located at the cutting position X1. If the controller 100 determines that the sheet P is not located at the cutting position X1 (S44: NO), in S45, the controller 100 operates the printer 3 to print the remainder of the image in a rearward part BP (see FIG. 8) on the second face SF2 of the sheet P. Thus, printing the image in second part PR2 on the second face SF2 of the sheet P may be split into S45, which is conducted before the sheet P is cut, and S45, which is resumed after the intermittence by the cutting action (S47).

As described above, the sheet P may be cut after the images are printed in the frontward part FP of the sheet P. In this arrangement, when the printing apparatus 1 prints images in the frontward part FP and the rearward part BP of the sheet P, the sheet P may not need to be conveyed reversely in the third conveying direction D3; therefore, compared to an arrangement, in which she sheet P is cut after the images are printed on both the frontward part FP and the rearward part BP of the sheet P, in which the sheet P may need to be conveyed reversely in the third conveying direction D3 to be cut by the cutter assembly 10, double-face printing may be conducted in a shorter time.

Meanwhile, optionally, the controller 100 may operate the printer 3 to print the images in an entire printable range on the second face SF2 of the sheet P in the second image printing process in S45. In other words, the predetermined part may consist of the entire printable range on the second face SF2 of the sheet P. In this arrangement, the controller 100 may, after S43, conduct S45 without conducting S44 or S47. The entire printable range on the second face SF2 may be a range on the second face SF2, in which the second image PI2 and the fourth image PI4 are printed.

In this arrangement, before the final line of image is printed completely in S46 (S46: NO), the controller 100 may conduct a reverse-conveying process, in which the controller 100 operates the conveyer rollers 60, 62, 64, 66 to convey the sheet P reversely in the third conveying direction D3 by a predetermined conveying amount. After the reverse-conveying process, the controller 100 may conduct the cutting process, in which the sheet P is cut by the cutter assembly 10.

In this arrangement, the sheet P may be cut after the images are printed in the entire printable range on the second face SF2 of the sheet P. Therefore, the printing apparatus 1 may conduct the cutting process without interrupting the image printing process.

<Cut-Print Process by Controller to Create Copy/Copies of Six Pages>

Figure 9:
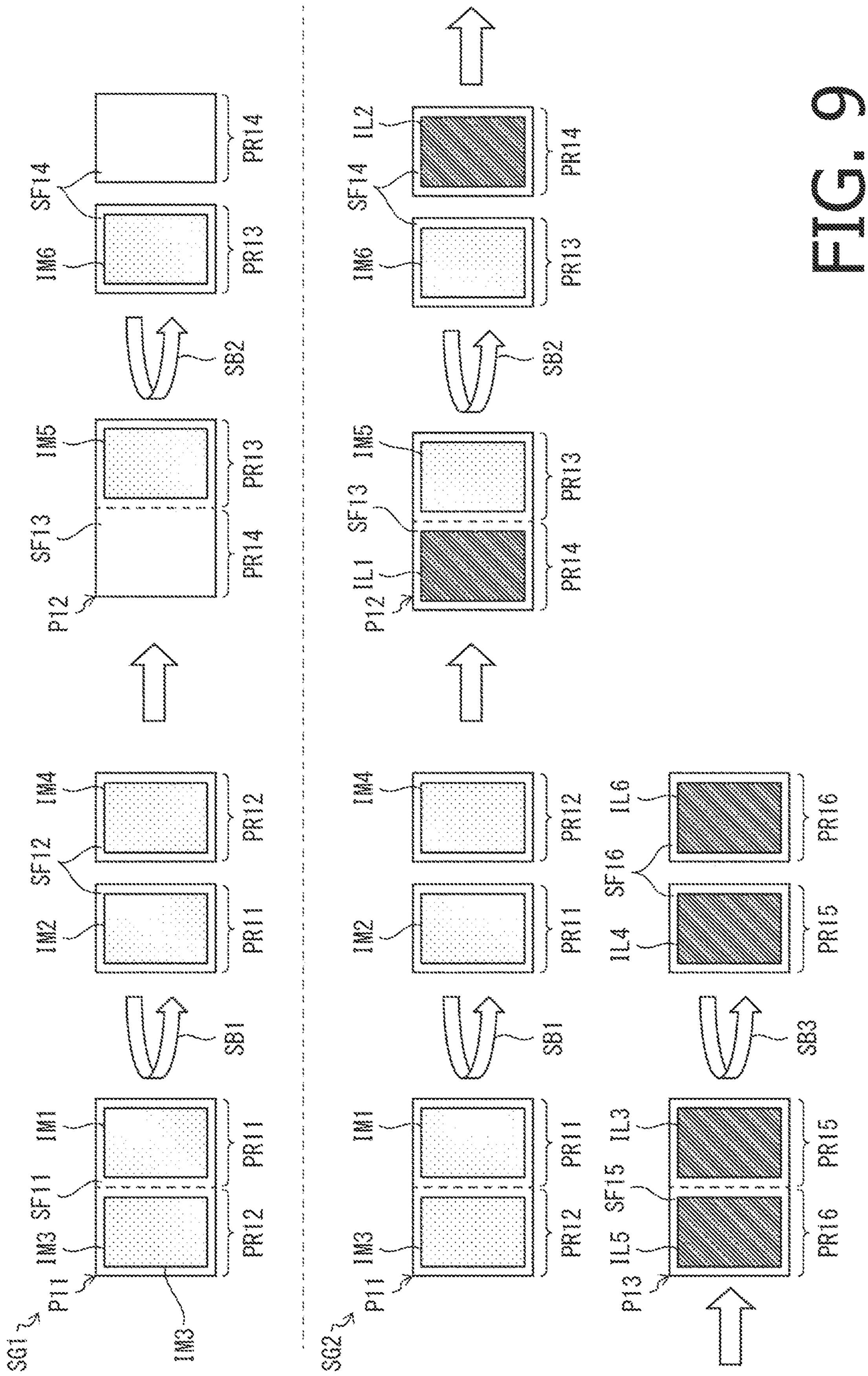
FIG. 9 illustrates flows of image printing and cutting of sheets in the print-cut process according to the flowchart shown in FIG. 7.

FIG. 9 illustrates flows of image printing and cutting of sheets P in the print-cut process according to the flowchart shown in FIG. 7. A reference sign SG1 in FIG. 9 denotes a flow to create a copy including images printed in six pages. A reference sign SG2 in FIG. 9 denotes a flow to create two copies, each of which includes images printed in six pages. Rightward arrows in FIG. 9 do not indicate a conveying direction but represent actions that a next sheet P is being fed. The process illustrated in FIG. 9 is the sort-print process mentioned above.

In the flow SG1 shown in FIG. 9, a first one of the sheets P will be called as a sheet P11, and a second one of the sheets P will be called as a sheet P12. In S42, as shown in the flow SG1 in FIG. 9, the controller 100 operates the printer 3 to print a third image IM3 in a range included in a second part PR12 on a first face SF11 of the sheet P11. Moreover, the controller 100 operates the printer 3 to print a first image IM1 in a range included in a first part PR11 on the first face SF11 of the sheet P11.

After printing the third image IM3 and the first image IM1 on the first face SF11 of the sheet P11, in S43, the controller 100 conducts a switchback action SB1. After the switchback action SB1, in S45, the controller 100 operates the printer 3 to print a second image IM2 in a range included in the first part PR11 on a second face SF12 of the sheet P11. The second image IM2 is an image to appear on a page, which is arranged to be later than the page containing the first image IM1 and earlier than the page containing the third image IM3, in the copy.

After printing the second image IM2 on the second face SF12 of the sheet P11, in S45, the controller 100 operates the printer 3 to print a fourth image IM4 in a range in the second part PR12 on the second face SF12 of the sheet P11. The fourth image IM4 is an image to appear on a page, which is arranged to be later than the page containing the third image IM3, in the copy. In midst of printing of the fourth image IM4, in S47, the controller 100 operates the cutter assembly 10 to cut the sheet P11 into the first part PR11 and the second part PR12. Thereafter, the controller 100 operates the conveyer rollers 60, 62, 64, 66 to eject the first part PR11 and the second part PR12 of the sheet P11 at the ejection tray 22. After ejecting the first part PR11 and the second part PR12 at the ejection tray 22, the controller 100 operates the feeder roller 23 to feed the sheet P12 to the printer 3 through the first conveyer path R1.

After feeding the sheet P12 to the printer 3, the controller 100 conducts S42 with the sheet P12. In particular, the controller 100 operates the printer 3 to print a fifth image IM5 in a range included in a first part PR13 on a first face SF13 of the sheet P12. The fifth image IM5 is an image to appear on a page, which is arranged to be later than the page containing the fourth image IM4, in the copy. In S42, the controller 100 does not print an image in a range included in a second part PR14 on the first face SF13 of the sheet P12.

After printing the fifth image IM5 on the first face SF13 of the sheet P12, in S43, the controller 100 conducts a switchback action SB2. After the switchback action SB2, the controller 100 operates the printer 3 to print a sixth image IM6 in a range included in the first part PR13 on a second face SF14 of the sheet P12. The sixth image IM6 is an image to appear on a page, which is arranged to be later than the page containing the fifth image IM5, in the copy. The controller 100 does not print an image in a range included in the second part PR14 on the second face SF14 of the sheet P12.

After printing the sixth image IM6 on the second face SF14 of the sheet P12, in S47, the controller 100 operates the cutter assembly 10 to cut the sheet P12 into a first part PR13 and a second part PR14. Thereafter, the controller 100 operates the conveyer rollers 60, 62, 64, 66 to eject the first part PR13 and the second part PR14 of the sheet P12 at the ejection tray 22.

Meanwhile, if the controller 100 conducts the cut-print process for a copy including images printed in five pages, in other words, even if no sixth image IM6 is printed in the range included in the first part PR13 on the second face SF14 of the sheet P12, the controller 100 still conducts the switchback action SB2.

As described above, when the sheets P are cut and ejected, the user may be provided with a copy of sheets P, in which the plurality of pages are collated. Therefore, usability to the user may be improved.

Next, the cut-print process to create two copies, each containing images printed in six pages, will be described. A reference sign SG2 in FIG. 9 denotes a flow to create two copies, each of which includes images printed in six pages.

In the flow SG2 shown in FIG. 9, a first one of the sheets P will be called as a sheet P11, a second one of the sheets P will be called as a sheet P12, and a third one of the sheets P will be called as a sheet P13. The controller 100 may conduct the sort-print process with the print data designated by a print job to create two copies. The process to print the first through fourth images IM1-IM4 with the sheet P11 is conducted by the controller 100 similarly to the flow SG1 in FIG. 9.

A process to be conducted by the controller 100, after the first part PR11 and the second part PR12 of the sheet P11 are ejected at the ejection tray 22 and the feeder roller 23 feeds the sheet P12 to the printer 3, will be described. As shown in the flow SG2 in FIG. 9, in S42, the controller 100 operates the printer 3 to print a first image IL1 for a second copy in a range included in the second part PR14 on the first face SF13 of the sheet P12. Further, the controller 100 operates the printer 3 to print a fifth image IM5 for the first copy in a range included in the first part PR13 on the first face SF13 of the sheet P12.

After printing the first image IL1 for the second copy and the fifth image IM5 for the first copy on the first face SF13 of the sheet P12, in S43, the controller 100 conducts a switchback action SB2. After the switchback action SB2, in S45, the controller 100 operates the printer 3 to print a sixth image IM6 for the first copy in a range included in the first part PR13 on the second face SF14 of the sheet P12. Further, the controller 100 operates the printer 3 to print a second image IL2 for the second copy in a range included in the second part PR14 on the second face SF14 of the sheet P12.

In midst of printing of the second image IL2 for the second copy, in S47, the controller 100 operates the cutter assembly 10 to cut the sheet P12 into the first part PR13 and the second part PR14. Thereafter, the controller 100 operates the conveyer rollers 60, 62, 64, 66 to eject the first part PR13 and the second part PR14 of the sheet P12 at the ejection tray 22.

After ejecting the first part PR13 and the second part PR14 at the ejection tray 22, the controller 100 operates the feeder roller 23 to feed the sheet P13 to the printer 3. After feeding the sheet P13 to the printer 3, the controller 100 conducts S42 with the sheet P13. In particular, the controller 100 operates the printer 3 to print a fifth image IL5 for the second copy in a range included in a second part PR16 on a first face SF15 of the sheet P13. Further, the controller 100 operates the printer 3 to print a third image IL3 for the second copy the in a range included in the first part PR15 on the first face SF15 of the sheet P13.

After printing the fifth image IL5 and the third image IL3 for the second copy on the first face SF15 of the sheet P13, in S43, the controller 100 conducts a switchback action SB3. After the switchback action SB3, in S45, the controller 100 operates the printer 3 to print a fourth image IL4 for the second copy in a range included in the first part PR15 on the second face SF16 of the sheet P13. Further, the controller 100 operates the printer 3 to print a sixth image IL6 for the second copy in a range included in the second part PR16 on the second face SF16 of the sheet P13.

In midst of printing of the sixth image IL6 for the second copy, in S47, the controller 100 operates the cutter assembly 10 to cut the sheet P13 into the first part PR15 and the second part PR16. Thereafter, the controller 100 operates the conveyer rollers 60, 62, 64, 66 to eject the first part PR15 and the second part PR16 of the sheet P13 at the ejection tray 22. In the second copy, the first through sixth images IL1-IL6 are collated, similarly to the first through sixth images IM1-IM6 in the first copy.

Thus, when the sheets P are cut and ejected completely, the plurality of sheets P including the first copy, in which the first through sixth images IM1-IM6 are collated, and the second copy, in which the first through sixth images IL1-IL6 are collated, are provided in the ejection tray 22.

Second Embodiment

Figure 10:
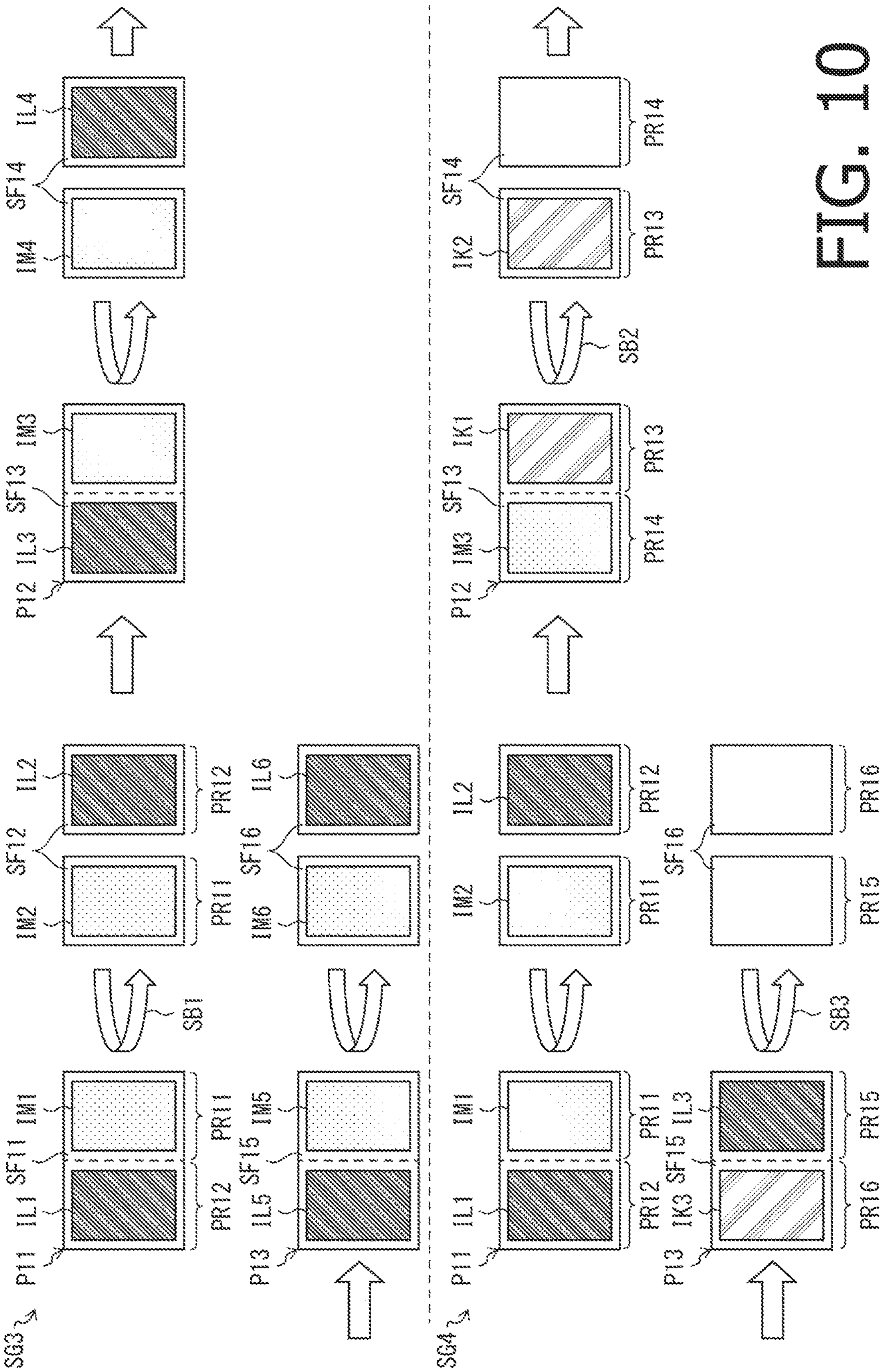
FIG. 10 illustrates flows of image printing and cutting of sheets in another print-cut process to be conducted in the printing apparatus.

A second embodiment of the present disclosure will be described below. In the following paragraphs, items that are substantially similar to those described above in the first embodiment may be referred to by the same reference signs, and description of those will be omitted. FIG. 10 illustrates flows of image printing and cutting of sheets P in the print-cut process to be conducted by the controller 100 according to the second embodiment of the present disclosure. The controller 100 may conduct the processes as illustrated in FIG. 10 for the first image printing process (S42) and the second image printing process (S45) to create multiple copies of images based on print data designated by a print job.

<Cut-Print Process by Controller to Create Two Copies of Six Pages>

FIG. 10 illustrates an example of the sheets P being cut in the print-cut process to create two copies, each of which includes images printed in six pages. Rightward arrows in FIG. 10 do not indicate a conveying direction but represent actions that a next sheet P is being fed. The flows SG3 and SG4 illustrated in FIG. 10 is a stack-print process, in which the same images are printed consecutively for the multiple copies.

As illustrated in the flow SG3 in FIG. 10, the controller 100 operates the printer 3 to print a first image IL1 for a second copy in a range included in a second part PR12 on a first face SF11 of a sheet P11. Further, the controller 100 operates the printer 3 to print a first image IM1 for a first copy in a range included in a first part PR11 on the first face SF11.

After printing the first image IL1 for the second copy and the first image IM1 for the first copy on the first face SF11 of the sheet P11, in S43, the controller 100 conducts a switchback action SB1. After the switchback action SB1, the controller 100 conducts the following processes.

In particular, the controller 100 operates the printer 3 to print a second image IM2 for the first copy in a range included in the first part PR11 on the second face SF12 of the sheet P11. Further, the controller 100 operates the printer 3 to print a second image IL2 for the second copy in a range included in the second part PR12 on the second face SF12 of the sheet P11. The second image IM2 is an image to appear on a page, which is arranged to be later than the page containing the first image IM1 in the first copy. The second image IL2 is an image to appear on a page, which is arranged to be later than the page containing the first image IL1 in the second copy.

In midst of printing of the second image IL2 for the second copy, in the same manner as S47 described above, the controller 100 operates the cutter assembly 10 to cut the sheet P11 into a first part PR11 a second part PR12. Thereafter, the controller 100 operates the conveyer rollers 60, 62, 64, 66 to eject the first part PR11 and the second part PR12 of the sheet P11 at the ejection tray 22. After ejecting the first part PR11 and the second part PR12 at the ejection tray 22, the controller 100 operates the feeder roller 23 to feed a sheet P12 to the printer 3.

The controller 100 operates the printer 3 to print images on the sheets P12, P13 in the same manner as the first image IM1 for the first copy, the first image IL1 for the second copy, the second image IM2 for the first copy, and the second image IL2 for the second copy on the sheet P11. In the following paragraphs, among the processes conducted by the controller 100, processes that are different from those in the flow SG2 in FIG. 9 will be described.

The controller 100 operates the printer 3 to print a third image IM3 for the first copy and a third image IL3 for the second copy on a first face SF13 of the sheet P12. Thereafter, the controller 100 operates the printer 3 to print a fourth image IM4 for the first copy and a fourth image IL4 for the second copy on a second face SF14 of the sheet P12.

Moreover, the controller 100 operates the printer 3 to print a fifth image IM5 for the first copy and a fifth image IL5 for the second copy on a first face SF15 of the sheet P13. Thereafter, the controller 100 operates the printer 3 to print a sixth image IM6 for the first copy and a sixth image IL6 for the second copy on a second face SF16 of the sheet P13.

In this arrangement, when the sheets P are cut and ejected, a stack of sheets, in which the same image for the multiple copies is printed consecutively, is provided, and usability to the user may be improved.

<Cut-Print Process by Controller to Create Three Copies of Three Pages>

The flow SG4 in FIG. 10 illustrates the sheets P being cut in the print-cut process to create three copies, each of which includes images printed in three pages. In the flow SG4 shown in FIG. 10, a first image IM1 for a first copy, a second image IM2 for the first copy, a first image IL1 for a second copy, and a second image IL2 for the second copy may be printed in the same manner as those in the flow SG3 in FIG. 10.

Processes to be conducted by the controller 100 after the first part PR11 and the second part PR12 of the sheet P11 are ejected at the ejection tray 22 and the feeder roller 23 feeds a sheet P12 to the printer 3 will be herein described. As illustrated in the flow SG4 in FIG. 10, the controller 100 operates the printer 3 to print a third image IM3 for the first copy in a range included in a second part PR14 on a first face SF13 of the sheet P12. Further, the controller 100 operates the printer 3 to print a first image IK1 for a third copy in a range included in a first part PR13 on the first face SF13.

After printing the third image IM3 for the first copy and the first image IK1 for the third copy on the first face SF13 of the sheet P12, in the same manner as S43 described above, the controller 100 conducts a switchback action SB2. After the switchback action SB2, the controller 100 operates the printer 3 to print a second image IK2 for the third copy in a range included in the first part PR13 on a second face SF14 of the sheet P12.

After printing the second image IK2 for the third copy on the second face SF14 of the sheet P12, the controller 100 does not print an image in a range included in the second part PR14 on the second face SF14 of the sheet P12. The controller 100, in the same manner as S47, operates the cutter assembly 10 to cut the sheet P12 into a first part PR13 and a second part PR14. Thereafter, the controller 100 operates the conveyer rollers 60, 62, 64, 66 to eject the first part PR13 and the second part PR14 of the sheet P12 at the ejection tray 22. After ejecting the first part PR13 and the second part PR14 at the ejection tray 22, the controller 100 operates the feeder roller 23 to feed a sheet P13 to the printer 3.

After feeding the sheet P13 to the printer 3, the controller 100 operates the printer 3 to print a third image IK3 for the third copy in a range included in a second part PR16 on a first face SF15 of the sheet P13. Moreover, the controller 100 operates the printer 3 to print a third image IL3 for the second copy in a range included in a first part PR15 on the first face SF15 of the sheet P13.

After printing the third image IL3 for the second copy and the third image IK3 for the third copy on the first face SF15 of the sheet P13, in the same manner as S43, the controller 100 conducts a switchback action SB3. After the switchback action SB3, without operating the printer 3 to print an image on a second face SF16 of the sheet P13, the controller 100 operates the cutter assembly 10 to cut the sheet P into a first part PR15 and a second part PR16, in the same manner as S47. Thereafter, the controller 100 operates the conveyer rollers 60, 62, 64, 66 to eject the first part PR15 and the second part PR16 of the sheet P13 at the ejection tray 22.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

What is claimed is:

1. A printing apparatus, comprising:

a conveyer configured to convey a printing medium;

a first conveyer path, in which the printing medium is conveyed in a first conveying direction;

a printer arranged in the first conveyer path, the printer being configured to print images on the printing medium;

a cutter assembly arranged in the first conveyer path, the cutter assembly being configured to cut the printing medium; and a controller configured to:

control the printer to print images for at least two pages on a first side being one of two sides of the printing medium, after printing the images on the first side of the printing medium, control the conveyer to move the printing medium from the first conveyer path to a second conveyer path through a switchback action, the second conveyer path being a path branched from and connected to the first conveyer path, and invert the printing medium by conveying in a second conveying direction, after inverting the printing medium, control the printer to print an image in a predetermined part on a second side opposite to the first side of the printing medium, the predetermined part being a frontward part of the printing medium in the first conveying direction, after printing the image in the predetermined part on the second side of the printing medium, control the cutter assembly to cut the printing medium, and after cutting the printing medium, control the printer to resume printing the image in a rearward part on the second side of the printing medium in the first conveying direction.

2. The printing apparatus according to claim 1, wherein the cutter assembly is configured to cut the printing medium into a first part located frontward and a second part located rearward in the first conveying direction, wherein the controller is configured to:

for printing the images on the first side of the printing medium, control the printer to print a first image in a range included in the first part on the first side of the printing medium and, before printing a second image, the second image being an image to appear on a page arranged to be later than a page containing the first image and earlier than a page containing a third image, print the third image in a range included in the second part on the first side of the printing medium, and after inverting the printing medium, for printing the image in the predetermined part on the second side of the printing medium, control the printer to print the second image in a range included in the first part on the second side of the printing medium.

3. The printing apparatus according to claim 1, wherein the cutter assembly is configured to cut the printing medium into a first part located frontward and a second part located rearward in the first conveying direction, wherein, for printing the images on the first side of the printing medium and for printing the image in the predetermined part on the second side of the printing medium based on print data designated by a print job for creating a plurality of copies, each of the plurality of copies including a first image and a second image, the second image being an image to appear on a page arranged to be later than a page containing the first image in each of the plurality of copies, the controller is configured to:

control the printer to print the first image for a first copy being one of the plurality of copies in a range included in the first part on the first side of the printing medium and the first image for a second copy being another one of the plurality of copies in a range included in the second part on the first side of the printing medium, and control the printer to print the second image for the first copy in a range included in the first part on the second side of the printing medium and the second image for the second copy in a range included in the second part on the second side of the printing medium.

4. A printing apparatus, a conveyer configured to convey a printing medium;

a first conveyer path, in which the printing medium is conveyed in a first conveying direction;

a printer arranged in the first conveyer path, the printer being configured to print images on the printing medium;

a cutter assembly arranged in the first conveyer path, the cutter assembly being configured to cut the printing medium; and a controller configured to:

control the printer to print images for at least two pages on a first side being one of two sides of the printing medium, after printing the images on the first side of the printing medium, control the conveyer to move the printing medium from the first conveyer path to a second conveyer path through a switchback action, the second conveyer path being a path branched from and connected to the first conveyer path, and invert the printing medium by conveying in a second conveying direction, after inverting the printing medium, control the printer to print an image in an entire printable range on a second side of the printing medium, and after printing the image in the entire printable range on the second side of the printing medium, control the conveyer to convey the printing medium reversely in a third conveying direction opposite to the first conveying direction by a predetermined conveying amount, and after conveying the printing medium in the third conveying direction by the predetermined conveying amount, control the cutter assembly to cut the printing medium.

* * * * *